May 27, 1941.  C. J. WERNER ET AL  2,243,615
MOTOR CONTROL SYSTEM
Filed July 3, 1939  2 Sheets-Sheet 1

INVENTORS
CALVIN J. WERNER
PAUL H. RUTHERFORD
BY
Spencer, Hardman and Fehr
ATTORNEYS May 27, 1941.                C. J. WERNER ET AL                2,243,615
                             MOTOR CONTROL SYSTEM
                             Filed July 3, 1939        2 Sheets-Sheet 2

INVENTORS
CALVIN J. WERNER
PAUL H. RUTHERFORD
BY
Spencer, Hardman & Fehr
ATTORNEYS Patented May 27, 1941

2,243,615

UNITED STATES PATENT OFFICE 2,243,615

MOTOR CONTROL SYSTEM

Calvin J. Werner and Paul H. Rutherford, Dayton, Ohio, assignors to General Motors Corporation, Detroit, Mich., a corporation of Delaware Application July 3, 1939, Serial No. 282,696

8 Claims. (Cl. 62—4)

This invention relates to an improved control system for an electric motor and particularly to a system for controlling the operation of an electric motor in accordance with temperature variations remote from the motor, as for instance variations in temperature in a refrigerator in which said motor drives the compressor.

The loads placed upon electric motors used for operating refrigerating apparatus fluctuates over a wide range. As the temperature within a refrigerating apparatus approaches a predetermined high value, the electric motor which drives said refrigerating apparatus will be subjected to a comparatively heavy load. When said temperature is lowered, however, the load to which the electric motor is subjected is substantially decreased, and at approximately 32° F. or less the motor will operate under substantially normal load conditions. Thus in case of a pump-down or when refrigeration has been terminated for defrosting purposes, the refrigerating apparatus becomes comparatively warm. Reestablishment of refrigerating operation thereafter will place an exceedingly heavy load upon the motor until such a time as the temperature within the refrigerator reaches a certain low value, after which the motor is subjected to substantially normal load requirements.

It is among the objects of the present invention to provide an electric motor capable of operating at a comparatively high torque when the temperature within the refrigerator is raised to a predetermined value, said motor being capable also of operating at a comparatively lower torque when the temperature within the refrigerator again reaches a predetermined low value.

A further object of the present invention is to provide a control system for such a motor whereby said motor will have proper circuits completed so that it will deliver or operate at high or low torque in accordance with temperature conditions within the refrigerator.

Further objects and advantages of the present invention will be apparent from the following description, reference being had to the accompanying drawings wherein a preferred embodiment of the present invention is clearly shown.

Figure 4:
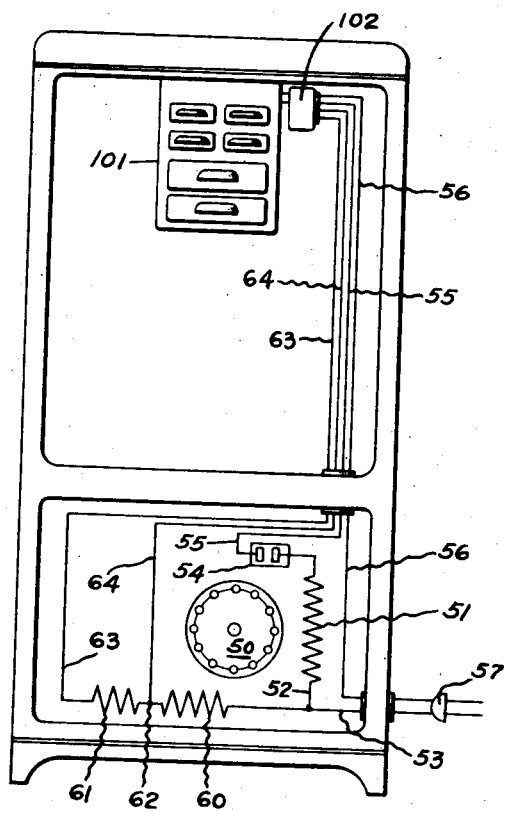
Fig. 4 is a view diagrammatically showing a refrigerator equipped with the present invention.

Referring to the drawings, the numeral 20 designates a thermal element provided within the refrigerator shown in Fig. 4 which thermal element is adapted to contract with lowering refrigeration temperatures and to expand as the temperature within the refrigerator increases. This thermal element 20 is shown in the form of a bellows having a bottom plate 21 to which is secured an actuator stud 22. This actuator stud 22 operatively engages the pivoted member 23 of a switch designated as a whole by the numeral 24. Member 23 is pivoted as at 23a and has a forked portion formed by the two spaced arms 25 and 26, the ends of which are pivotally engaged by movable contact arms 27 and 28 respectively. A spring 29 is interposed between the switch member 23 and stationary element 30, this spring urging the arm 23 into constant engagement with the actuator stud 22 of the bellows. A coil spring 31 has one end anchored to the arm 25 while its opposite end is anchored to the contact plate or arm 27, this spring quickly urging the contact plate or arm 27 in one direction or the other in response to the movement of the switch arm 23 by the bellows 20 or spring 29. A similar spring 32 is anchored between the arm 26 and the contact plate or arm 28 and actuates contact plate or arm 28 in a like manner when the switch arm 23 is moved by either the bellows 20 or spring 29. A stop 33 is engaged by contact arm 27 in one instance while contact 34 of said arm 27 is adapted to engage the stationary contact 35 in another instance, or more specifically when spring 31 moves its contact arm 27 counter-clockwise about its pivotal connections with the switch arm 25. Contact arm 25 has two oppositely disposed contacts 40 and 41, contact 40 being adapted to engage stationary contact 42 when the spring 32 moves contact arm 28 counter-clockwise about its pivotal engagement with arm 26, and contact 41 is adapted to engage stationary contact 43 when contact arm 28 is moved clockwise about its pivotal connection with said arm 26.

Figure 1:
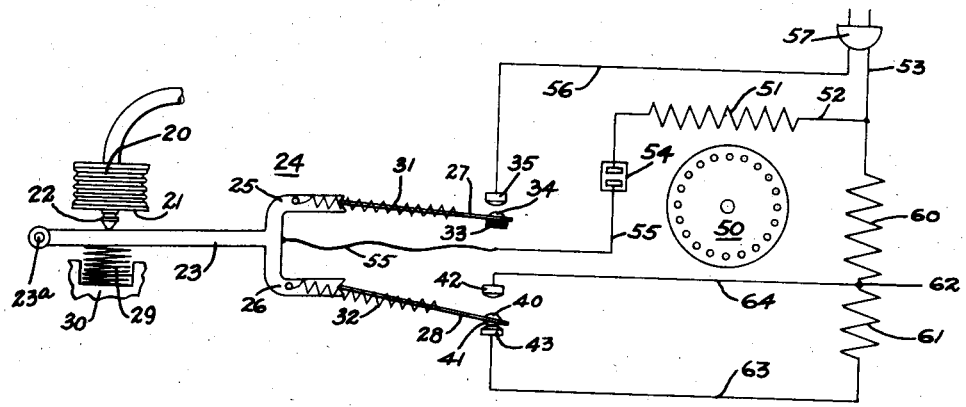
Fig. 1 is a diagrammatic view showing the electric circuits and their connections when the system is not operating and the temperature within the refrigerator is at a predetermined low value.

The electric motor designated as a whole by the numeral 50 has a starting winding 51. One end of this starting winding is connected through wire 52 with the wire 53 connectible with one side of the power line, while the other end of the starting winding 51 is connected to one side of the starting control switch 54. This starting control switch may be of any suitable standard design which, when the motor is operating normally and at a predetermined running speed, will automatically render said starting winding ineffective by completely cutting it out of the circuit as shown in Fig. 1. Such a switch may be either magnetically, thermally or centrifugally controlled so that before the motor reaches a predetermined speed the circuit through the starting winding will remain complete while, on the contrary, when the motor has attained its proper operating speed, switch 54 will automatically cut the starting winding out of the circuit.

The opposite side of said switch 54 is connected through wire 55 with the switch arm 23. The stationary contact 35 is connected by wire 56 to the terminal 57, which is adapted to connect wire 56 with the power supply line.

Figure 2:
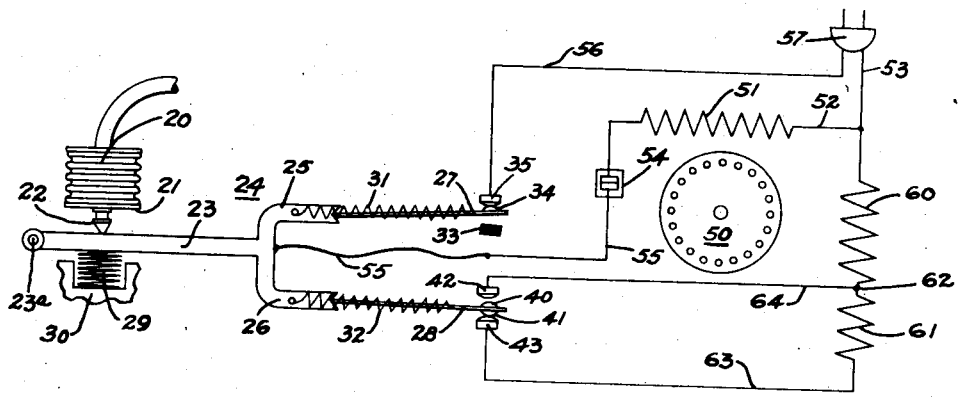
Fig. 2 is a view similar to Fig. 1 showing the circuit connections of the electric motor and its control mechanism during normal operation.
Figure 3:
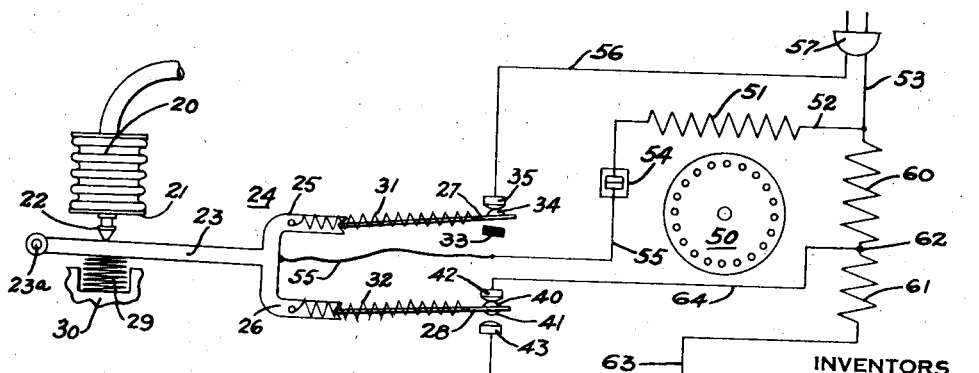
Fig. 3 is a view similar to Figs. 1 and 2, showing the circuit connections when the temperature within the refrigerator is at a predetermined high value.

The electric motor 50 is also provided with a running winding which, in this instance, comprises two sections 60 and 61 connected together at the point 62. Wire 53 is connected to the outer end of the running winding 60 while a wire 63 is connected to the outer end of the running winding 61 and also to the stationary contact 43. A wire 64 electrically connected at the point 62 where the inner ends of the two field windings 60 and 61 are connected together, is also connected with stationary contact 42. From this it may be seen that the electric motor 50 has what may be termed a "tapped" or "divided" running winding comprising the two sections 60 and 61 with their intermediate connection 64. A refrigerator equipped with the present invention is diagrammatically illustrated in Fig. 4. The numeral 100 designates the refrigerator cabinet in which an evaporator 101 is provided. The casing 102 in which the entire assembly of switch 24 is housed, is secured within the refrigerator cabinet in juxtaposition to the evaporator 101 so that the ambient temperature of the evaporator may affect the bellows 21 of the switch to cause switch operation. A predetermined maximum rise in the temperature ambient to the evaporator 101 will cause the bellows 21 to expand, thus actuating the switch into the position as shown in the Fig. 3. As the temperature ambient to the evaporator 101 drops, the bellows 21 will contract, such contraction actuating the switch into the position as shown in Fig. 2. A further drop in the temperature ambient to the evaporator will cause a further contraction of the bellows, thereby actuating the switch to assume a position as shown in Fig. 1.

As has been stated before, the diagrammatic view of Fig. 1 shows the arrangement of the circuits when the bellows 20 is contracted in response to a predetermined low temperature within the refrigerator in which said bellows 20 is positioned. Now as this temperature rises, bellows 20 will gradually expand, causing the actuator stud 22 to be moved downwardly to move the switch arm 23 clockwise about its pivot 23a against the effect of spring 29. This clockwise movement of the arm 23 will cause movement of the contact arm 27 counterclockwise inasmuch as it is in engagement with the stop 33. When the pivotal connection of contact arm 27 with switch arm portion 25 passes beneath the plane intersecting the points of mounting of spring 31, contact arm 27 will be urged counterclockwise about its pivotal point with a quick, sudden movement so that its contact element 34 will engage with the stationary contact 35. Now current from the one side of the power supply line will flow through the wire 56 to the stationary contact 35, thence to its engaging contact 34 through contact arm 27, switch arm portion 25 through the wire 55 which connects thereto, to the one side of the starting switch 54 across this now closed switch through the starting winding 51 back to the opposite side of the power line via the wires 52 and 53 and connector 57. This, as will be seen, completes the starting circuit. At this same time contact member 41 of contact arm 28 will not have been moved out of engagement with its stationary contact 41, thus the circuit from the contact arm portion 25 will be completed through switch arm 26 across contacts 41 and 43 through the wire 63, thence through the running winding sections 61 and 60, wire 53, back to the opposite side of the power line through the connector 57. The motor will now start to operate and, as has been mentioned heretofore, as soon as it reaches the proper speed, switch 54 will open the circuit through the starting winding 51, thus maintaining only the circuit through the running winding sections 61 and 60 until lowering temperature conditions within the refrigerator cause the bellows to again actuate the switch 24 to break the contacts 34—35 completely to stop the motor.

While the refrigerating apparatus is inactive the interior of the refrigerator will naturally become warmer and as this happens bellows 20 will expand, moving the actuator stud 22 thereof downwardly to exert a pressure upon the switch arm 23. This arm 23 will now be moved clockwise about its pivot 24 against the effect of spring 29 and consequently in response to this movement of the switch arm 23 and after switch blade 27 has been moved by spring 31 to cause engagement of contact 35 by contact 34, spring 32 interposed between switch arm portion 26 and the contact blade or arm 28 will move said blade upwardly at a predetermined point so that its contact 41 will be moved out of engagement with contact 43, while its contact 40 will be moved to engage contact 42. The starting switch 54 being closed, will cause the motor to operate to drive the refrigerating apparatus. Under these circumstances only the portion 60 of the running winding will be effective inasmuch as contact 42 is connected at point 62, at which point sections 60 and 61 of the starting winding are in electrical connection. With only this portion 60 of the running winding in circuit, the motor will operate at its highest torque, this being necessary inasmuch as the higher temperature of the box causes an excessive load to be put upon the motor to drive the refrigerating apparatus for purposes of bringing the temperature within the refrigerator to a normal low average. Naturally as the temperature within the refrigerator is decreased the bellows 20 will contract, thus permitting spring 29 to urge and move the switch arm 23 counterclockwise about its pivotal point 24 so that eventually the switch arm will be moved to bring the switch 24 into the normal operating position as shown in Fig. 2, at which a normal low temperature is reached within the refrigerator. Further decrease in refrigerator temperature will continue contraction of bellows 20 which at a predetermined point permits the switch 24 to be moved into the position as shown in Fig. 1, in which position the circuit to the electric motor is entirely cut off due to the separation of the contacts 34 and 35 which are in circuit with one side 56 of the power line.

From the aforegoing it may be seen that applicant has provided a control device for an electric motor which automatically changes the characteristic of the motor in accordance with load conditions caused by variations in the temperature outside the motor, for instance within a refrigerator. Thus when the temperatures within the refrigerator are extremely high, as at times of defrosting or under pump-down conditions, the circuit through the motor is so completed that only a portion of its running winding will be effective, thereby increasing its torque. However, during normal operation, that is, when the temperatures within the refrigerator reach a normal range, say of approximately 32°, then the control device will automatically change the circuits through the motor in response to such temperature decrease within the refrigerator so that the entire running winding including portions 60 and 61 of the electric motor will become effective, reducing the torque as well as increasing the efficiency of the motor for, during this time the motor is not subjected to the excessive load as when the temperature within the box is excessively high. Again this control device will automatically render the motor entirely ineffective by breaking one side of its circuit when the temperature within the refrigerator has reached a predetermined low degree. This control device for varying the effectiveness of the motor is actuated in response to conditions outside the electric motor as, for instance, temperature conditions within a compartment of a refrigerator.

While the embodiment of the present invention as herein disclosed constitutes a preferred form, it is to be understood that other forms might be adopted, all coming within the scope of the claims which follow.

What is claimed is as follows:

1. In a control system, the combination with an electric motor having starting and running windings; of means adapted to render the starting winding ineffect've when the motor is running properly; and means separate from the aforementioned means and responsive to variations in temperature ambient thereto for completing one circuit or another, the one circuit including only a part of the running winding, the other circuit including the entire running winding.

2. In a control system, the combination with an electric motor having a plurality of circuits, one including a starting winding and the others a running winding; of means adapted automatically to render the starting winding ineffective when the motor has attained proper running speed; and means separate from the aforementioned means, responsive to temperature variations ambient thereto for completing one motor circuit or another, the said one circuit including only a part of the entire running winding for high torque operation and the other circuit including the entire running winding for low torque operation.

3. In a control system, the combination with an electric motor having a plurality of circuits including a starting winding and a running winding; of means for rendering the starting winding ineffective when the motor has attained a proper operating speed; and thermal means separate from the first mentioned means responsive to temperature conditions remote from the electric motor for completing one or another motor circuit, to render effective either the entire or only a portion of the running winding, dependent upon temperature conditions.

4. A control system for an electric refrigerator, the combination with the cooling unit of said refrigerator, of an electric motor having a starting and a running winding; means for rendering the starting winding ineffective when the motor has attained a proper operating speed; and a separate thermal switch adapted to be actuated in response to varying temperatures ambient to the cooling unit, said switch being adapted to render either the entire or only a portion of the running winding effective, dependent upon the temperature conditions in the refrigerator.

5. In an electric refrigerator control system, the combination with the evaporator of said refrigerator, of an electic motor having a starting and a running winding; means for rendering the starting winding ineffective when the motor has attained a proper operating speed; a switch independent of said means and having two stationary and a cooperating movable contact, the stationary contacts being connected to one end and at an intermediate point of the running winding respectively; and means for actuating said movable contact into engagement with one or the other stationary contacts to render either the entire running winding or only a portion thereof effective in accordance with temperature conditions ambient to the evaporator.

6. In an electric refrigerator control system, the combination with the evaporator of said refrigerator, of an electic motor having a starting and a running winding; means for rendering the starting winding ineffective when the motor has attained a proper operating speed; a switch independent of said means and having two stationary contacts and a movable contact, the one stationary contact being connected to one end of the running winding, the other contact being connected to the said winding intermediate its ends; and thermal means adjacent the evaporator, adapted to actuate the movable contact to engage the one stationary contact to complete the circuit including the entire running winding in response to a predetermined low temperature ambient to the evaporator, and to move the movable contact into engagement with the other stationary contact to complete the circuit through only a portion of the running winding in response to a predetermined higher temperature ambient to the evaporator.

7. In a control system, the combination with an electric motor having starting and running windings, means adapted to disconnect the starting winding when the motor is running at proper operating speed; and a thermo-switch having separately acting contacts certain of which control the circuits of both the starting and running windings, the others being adapted to connect either a part or the entire running winding in series with the first mentioned contacts.

8. In a control system, the combination with an electric motor having starting and running windings, means adapted to disconnect the starting winding when the motor is running at proper operating speed; a switch having a plurality of sets of cooperating contacts, one set controlling all of the circuits, the other set being adapted to render either the whole or only a portion of the running winding effective when said first set of contacts are closed, and means for actuating said contacts in accordance with variations in temperature ambient thereto.

CALVIN J. WERNER.
      PAUL H. RUTHERFORD.